United States Patent [19]
Barber, Sr.

[11] Patent Number: 6,061,635
[45] Date of Patent: May 9, 2000

[54] SEISMIC HANDLING DEVICE

[75] Inventor: Harold Pauley Barber, Sr., Fulshear, Tex.

[73] Assignee: SeaScan, Inc., Houston, Tex.

[21] Appl. No.: 09/074,032

[22] Filed: May 6, 1998

[51] Int. Cl.$^7$ .................................................. G01V 1/04
[52] U.S. Cl. .............................................. 702/14; 702/16
[58] Field of Search .......................... 702/14, 16; 367/23

[56] References Cited

U.S. PATENT DOCUMENTS

| | | | |
|---|---|---|---|
| 4,142,353 | 3/1979 | Bruce et al. .................................. | 57/22 |
| 4,479,183 | 10/1984 | Ergas ........................................ | 364/421 |
| 4,597,352 | 7/1986 | Norminton ................................ | 114/254 |
| 4,648,647 | 3/1987 | Patton ..................................... | 294/67.1 |
| 4,757,482 | 7/1988 | Fiske, Jr. ................................. | 367/144 |
| 4,793,274 | 12/1988 | Regone ..................................... | 114/242 |
| 5,486,082 | 1/1996 | Feldman et al. ......................... | 414/542 |

*Primary Examiner*—Christine K. Oda
*Assistant Examiner*—Victor J. Taylor
*Attorney, Agent, or Firm*—Daniel F. Perez; Lawrence R. Youst

[57] ABSTRACT

A seismic handling device for safely transporting, deploying, and retrieving a seismic unit on a sea vessel is disclosed. The seismic handling device comprises a plurality of vertical structural members extending from the vessel. A plurality of horizontal structural members are connected to the vertical structural members. A delivery system is securely attached to the horizontal structural members. The delivery system positions the seismic unit into the sea, tows the seismic unit during a survey and retrieves the seismic unit from the sea.

20 Claims, 7 Drawing Sheets

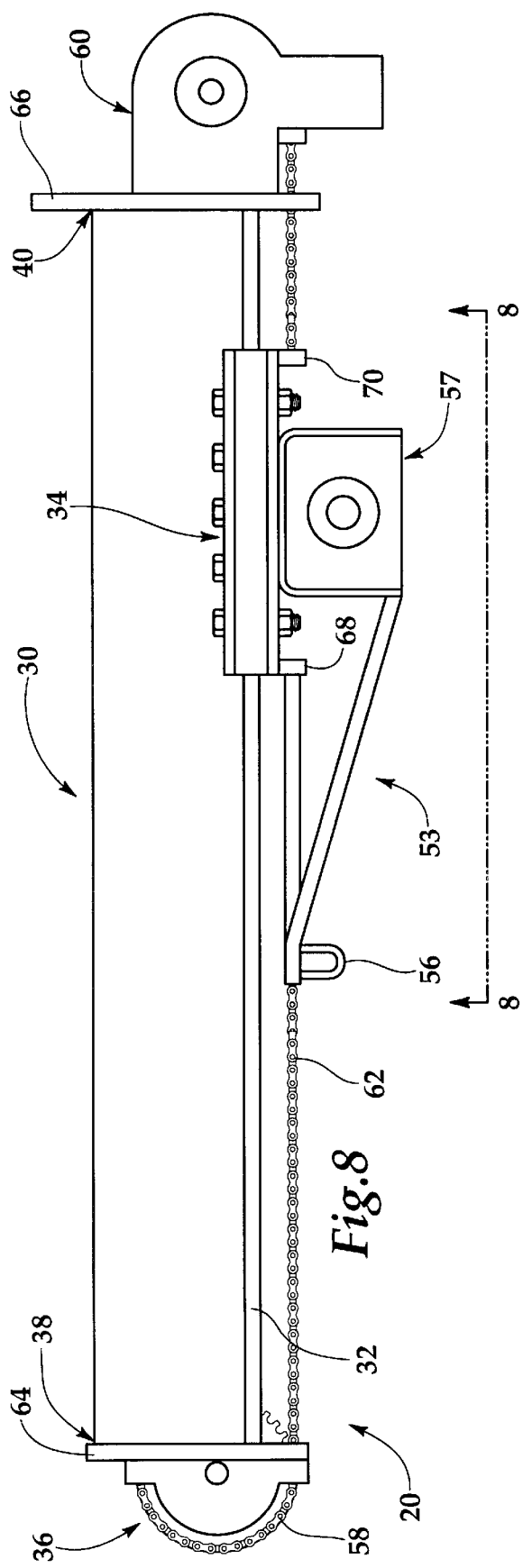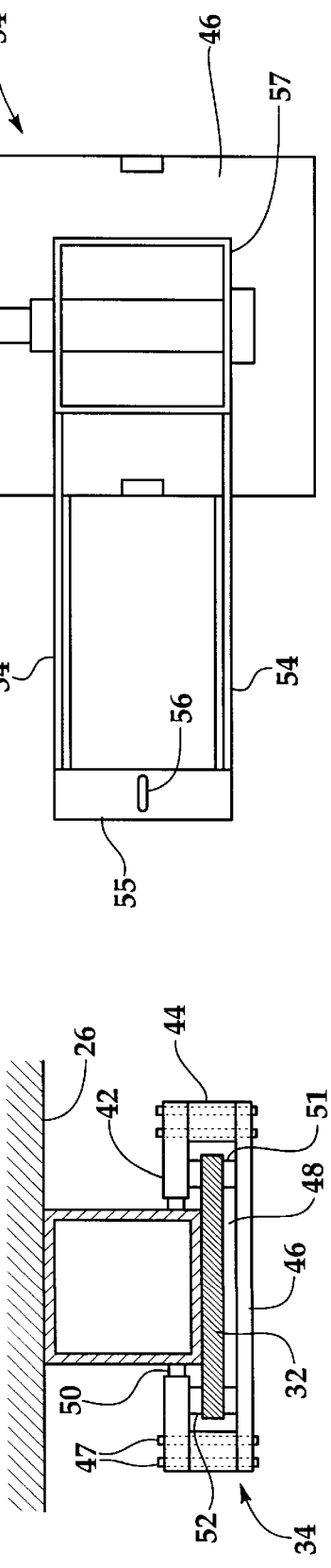

SEISMIC HANDLING DEVICE

TECHNICAL FIELD OF THE INVENTION

The present invention relates, in general, to the field of seismic exploration and, more particularly, to a seismic handling device for transporting, deploying, and retrieving a seismic exploration device from a sea vessel.

BACKGROUND OF THE INVENTION

Without limiting the scope of the invention, its background is described in connection with marine seismic exploration of the earth's strata located below a body of water, usually a sea but could be inland lake or rivers as an example.

In the field of marine seismic exploration, seismic prospecting has been used in the industry to obtain the survey data necessary for directing offshore or inland lakes and rivers drilling operations. Seismic prospecting of hydrocarbons and other natural resources found in relatively deep formations of the earth's crust has required the use of offshore survey data. Such data can be collected by using mobile survey vessels equipped with seismic exploration devices of type described in U.S. Pat. Nos. 4,956,822 (the '822 patent) and 5,469,404 (the '404 patent) to Barber, et al.

The seismic exploration devices described in the '822 and '404 patents are multiple air gun systems. The devices are designed to maximize the efficiency of the air guns by positioning the air guns in a particular geometry with a particular spacing. Changes in the specific arrangement of the air guns can result in the devices providing inaccurate, or less reliable, data. Since the majority of seismic exploration occurs in the open waters of seas and oceans, reliable transportation, deployment, and retrieval of seismic exploration devices is needed to prevent damage to the seismic exploration device and misalignment of the air guns. In addition, the equipment must provide stability to the seismic exploration device during their operation. Since the seismic exploration devices are towed behind a vessel, it is necessary to provide a safe, sturdy, reliable manner by which to launch recover and maintain a connection between the vessel and the deployed seismic exploration device, especially while surveying in rough seas while not effecting its operation. In addition, a reliable storage apparatus is required for containing the seismic exploration device while in transit to and from the survey area.

Few, if any, handling devices have been developed which provide the safety and stability in transportation, deployment and retrieval of seismic exploration devices. A need has therefore arisen for such a handling device so that the data obtained from seismic exploration devices remains accurate and dependable.

SUMMARY OF THE INVENTION

The present invention disclosed herein provides for safe transportation, deployment and retrieval of sophisticated seismic exploration devices. The seismic handling device of the present invention is designed for the transporting, deploying and retrieving of seismic exploration devices used in conjunction with a typical sea vessel used to tow the seismic exploration devices.

In one embodiment of the present invention, the seismic handling device comprises a plurality of generally vertical structural members extending from the sea vessel. A plurality of generally horizontal structural members are connected to the vertical structural members. At least one overhead boom is substantially positioned within the vertical and horizontal structural members. The overhead boom may have a first end and a second end with a first sprocket mount plate fastened to the second end and a second sprocket mount plate fastened to the second end. A boom plate is attached to the overhead boom. A deployment mechanism is mounted to the boom plate. The deployment mechanism is adapted to freely move horizontally along the boom plate. In addition, a drive mechanism is connected to the overhead boom and the deployment mechanism. The drive mechanism propels the deployment mechanism horizontally along the overhead boom and the boom plate.

A preferred method for deploying and retrieving the seismic exploration unit from the sea vessel is also presently disclosed. The seismic exploration device is transported on the vessel to a predetermined location in the sea. Once at the predetermined location, the seismic exploration device is deployed into the sea using a seismic handling device mounted on the vessel. After the seismic exploration device is deployed into the sea, the vessel tows the seismic exploration device at a predetermined distance from the vessel. Upon conclusion of the seismic exploration, the seismic exploration device is retrieved from the sea.

Among the features of the invention are the safety and stability that the seismic handling device provides when transporting, deploying, and retrieving the seismic exploration device in the sea, especially during rough sea conditions. The seismic handling device provides a controlled delivery of the seismic exploration device into the sea. Furthermore, the overhead boom provides safety for both the seismic exploration device and the people on the vessel during the deployment and retrieval phase. Since it is critical to maintain proper geometry of the air guns, preventing misalignment while deploying the seismic exploration devices becomes critical. By allowing the seismic exploration device to be carried above the deck of the vessel, the overhead boom prevents misalignment of the air guns associated with the seismic exploration device. By preventing misalignment both in the deployment and retrieval phases of operation of the seismic exploration device, the seismic handling device of the present invention allows for collection of accurate data.

BRIEF DESCRIPTION OF DRAWINGS

For a more complete understanding of the features and advantages of the present invention, reference is now made to the detailed description of the invention along with the accompanying figures in which corresponding numerals in the different figures refer to corresponding parts and in which:

FIG. 7 is a cross sectional view of a overhead boom and a deployment mechanism taken along line 7—7 of FIG. 4;

FIG. 8 is a side elevation view of a delivery system of the present invention; and FIG. 9 is a bottom elevation view of the deployment mechanism taken along line 8—8 of FIG. 8.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not limit the scope of the invention.

Figure 1:
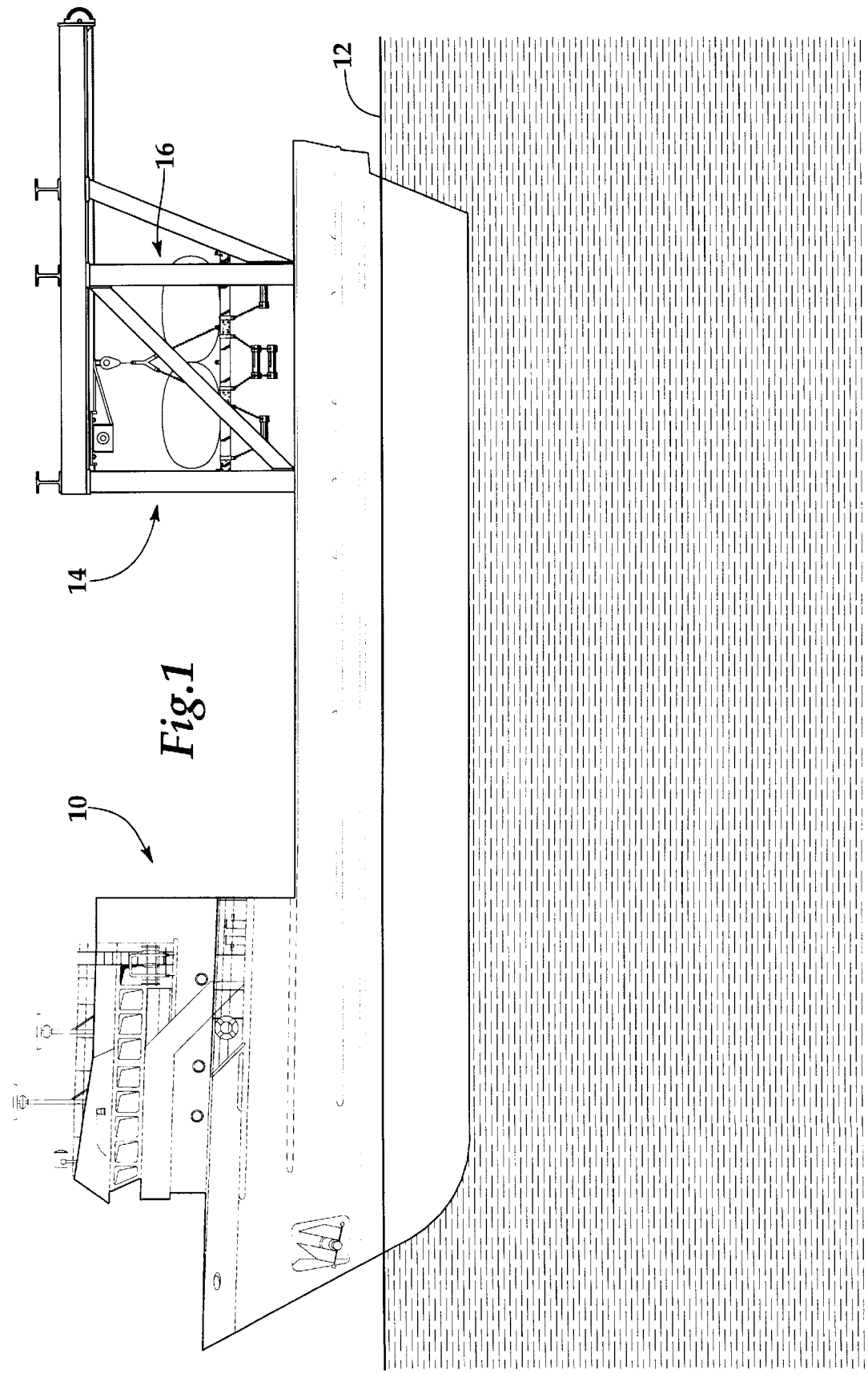
FIG. 1 is a side elevation view of a sea vessel having a seismic handling device of the present invention with a seismic exploration device mounted thereto in the stern of the vessel.

A sea vessel 10 used for seismic exploration is generally depicted in FIG. 1. The vessel 10 is generally shown in the sea 12. A seismic handling device 14 is mounted in the stern of the vessel 10, and coupled to a seismic exploration device 16 which awaits deployment into the sea 12. A detailed description of the seismic exploration device 16 can be found in U.S. Pat. Nos. 4,956,822 and 5,469,404 to Barber et. al. which are hereby incorporated by reference.

Figure 2:
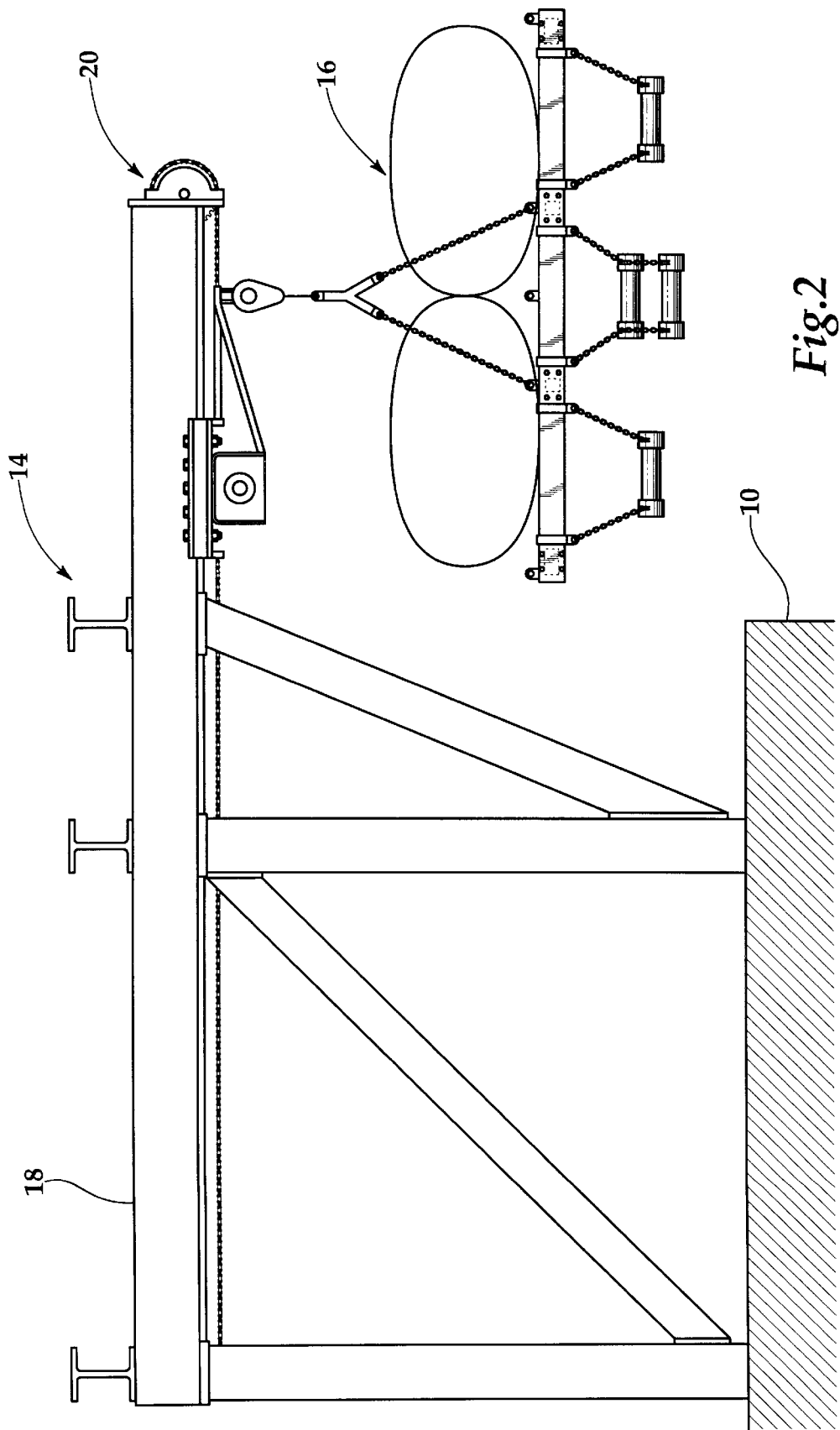
FIG. 2 is an enlarged side elevation view of a seismic handling device of the present invention.
Figure 3:
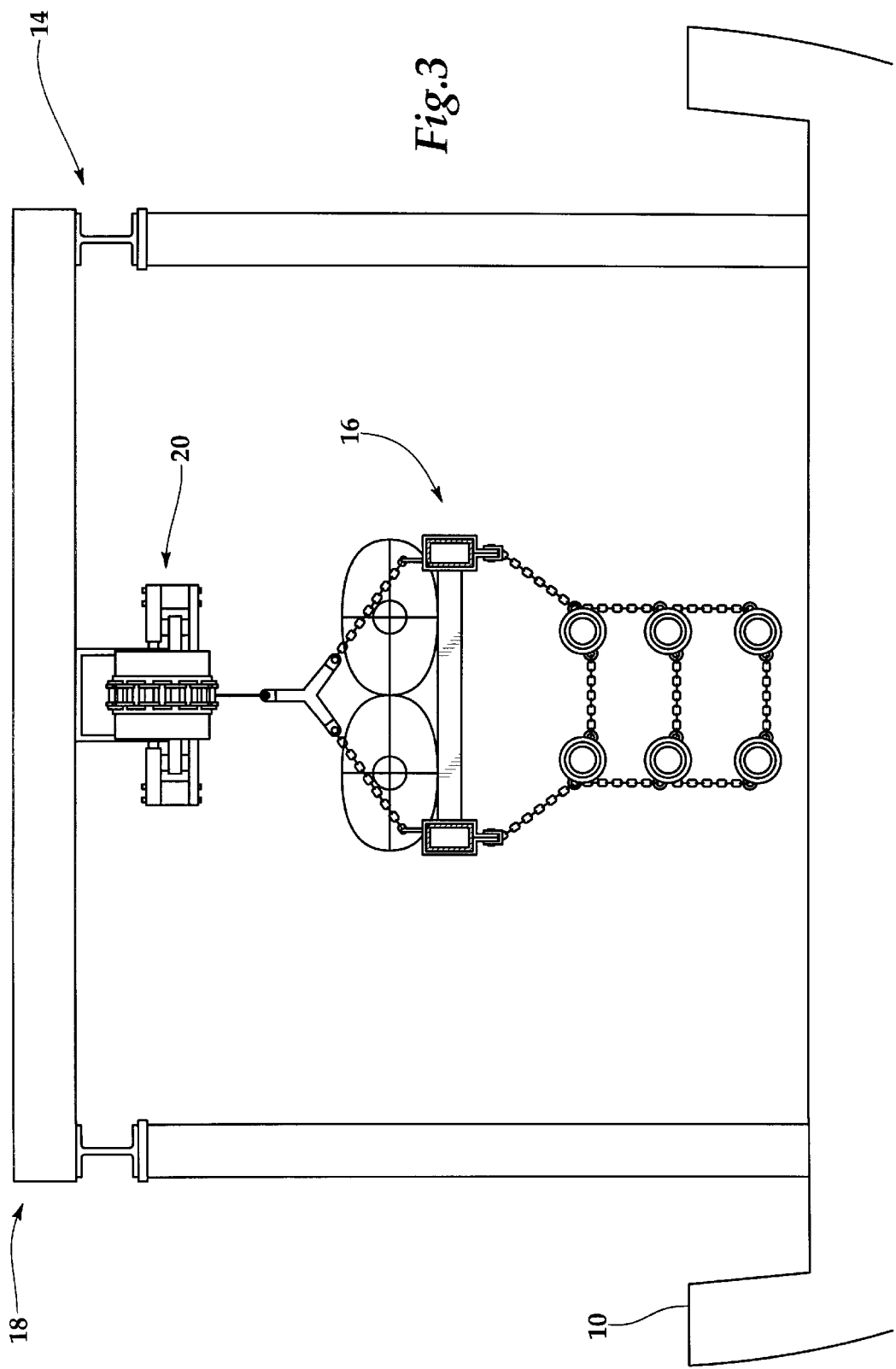
FIG. 3 is a rear elevation view of a seismic handling device of the present invention with a seismic exploration device mounted thereto.

FIGS. 2 and 3 demonstrate more clearly the interrelation between the vessel 10, the seismic handling device 14, and the seismic exploration device 16 of FIG. 1. The seismic handling device 14 is shown in FIG. 2 having a support frame 18 and a delivery system 20. The delivery system 20 substantially extends beyond the stern of the vessel 10 allowing the seismic exploration device 16 to be safely deployed into the sea 12. The seismic exploration device 16 is coupled to the delivery system 20 as generally illustrated in FIGS. 2 and 3. The delivery system 20 moves the seismic exploration device 16 horizontally along the stern of the vessel 10 enabling the seismic exploration device 16 to be properly positioned for deployment and retrieval.

Figure 4:
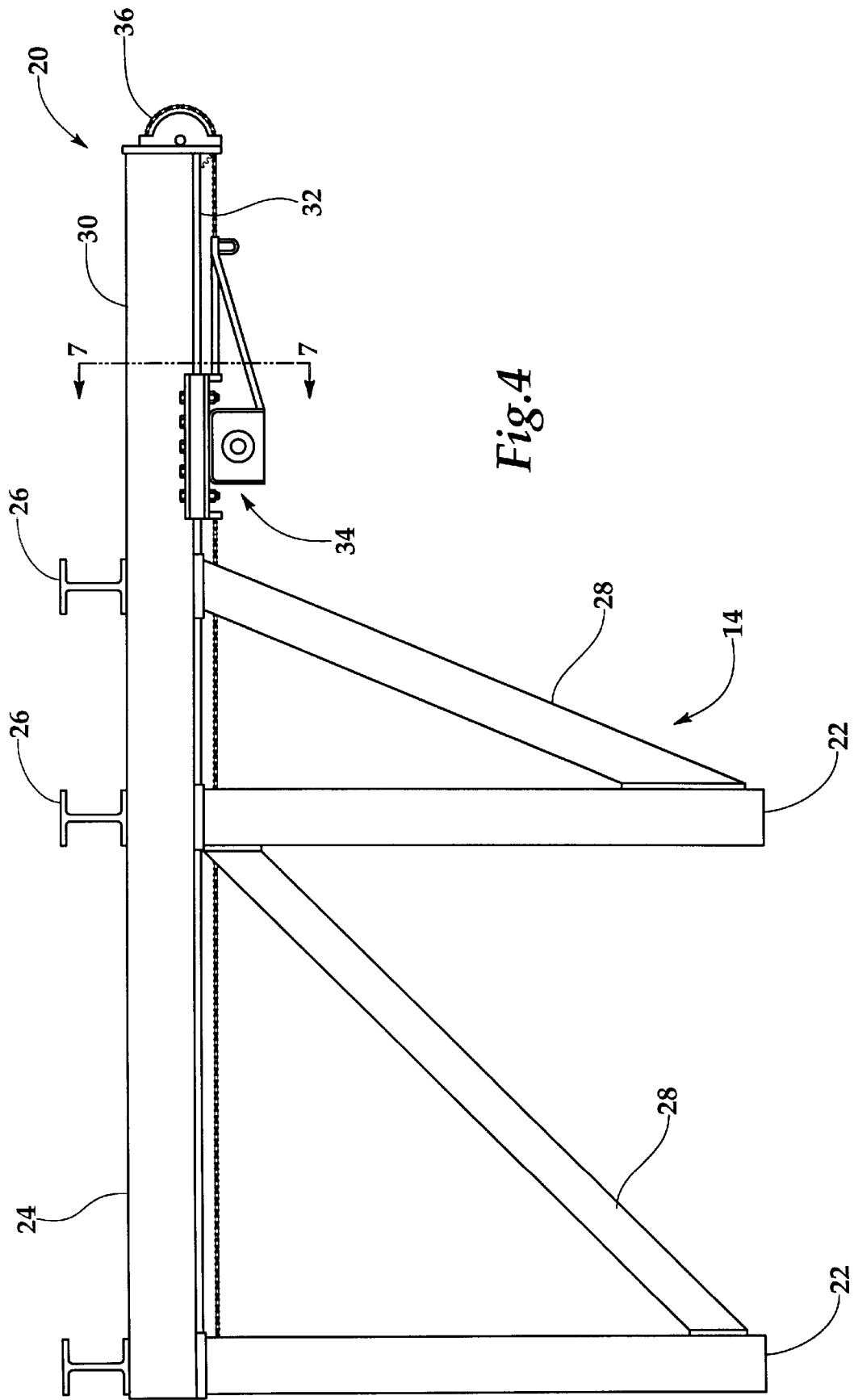
FIG. 4 is a side elevation view of the seismic handling device of the present invention.
Figure 5:
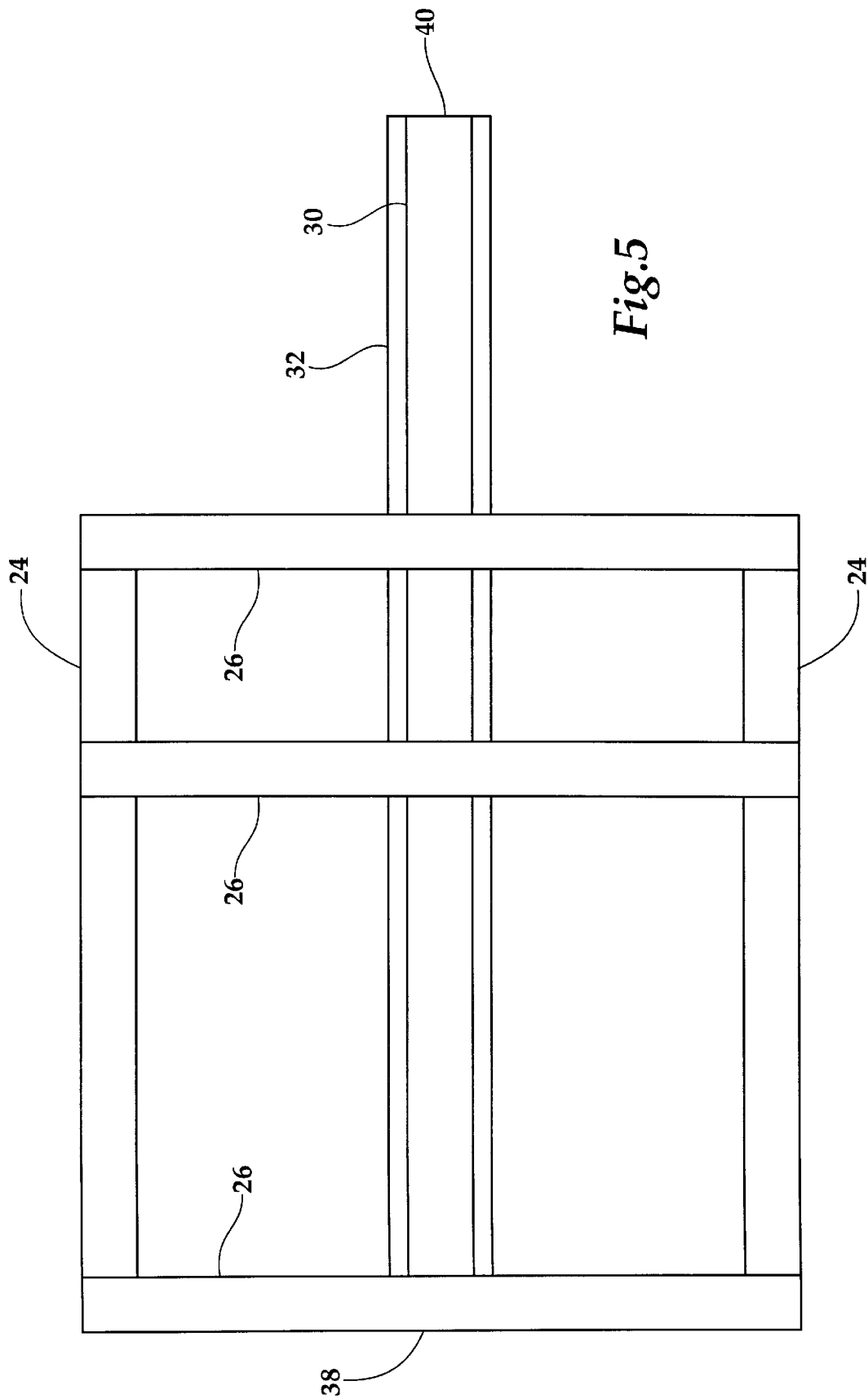
FIG. 5 is a top elevation view of a seismic handling device of the present invention.

As best seen in FIGS. 4 and 5, the seismic handling device 14 can include a plurality of vertical structural members 22. Connected to the vertical structural members 22 is a plurality of horizontal structural members 24. The horizontal structural members 24 may be affixed to the vertical structural members 22 forming sides of the seismic handling device 14. A plurality of cross structural members 26 can be connected to the horizontal structural members 24 interconnecting the sides of the seismic handling device 14. Additional stability can be attained by attaching a plurality of support members 28 to the vertical structural members 22 and the horizontal structural members 24 at predetermined locations. As shown in FIG. 4, conventional steel beams, such as I-beams, may be used for the different structural members, 22, 24, 26 and 28. Once the structural members 22, 24, 26, and 28 are assembled, a suitable protective coating may be applied to the structural members to retard corrosion of the seismic handling device 14.

Figure 6:
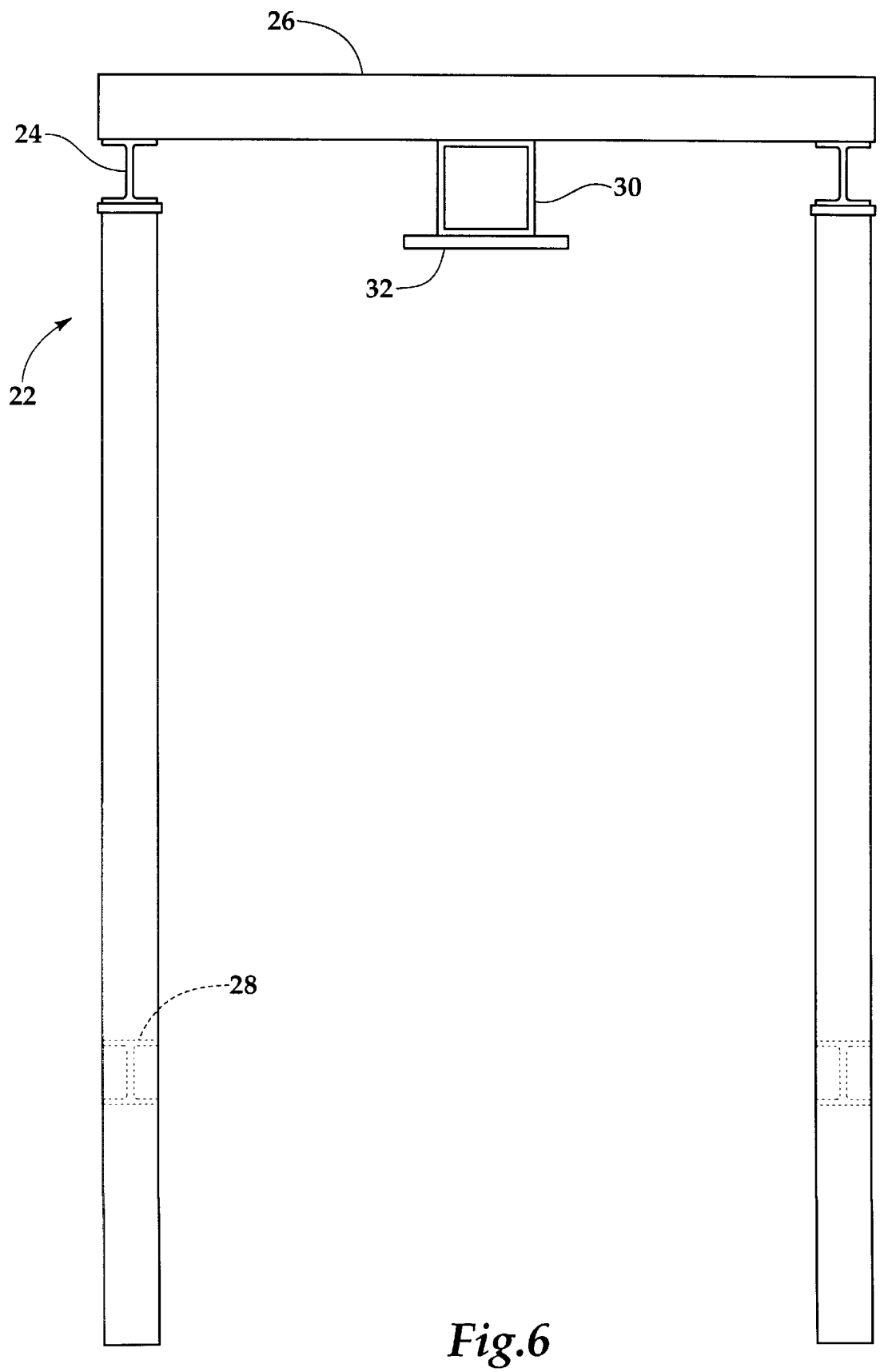
FIG. 6 is a front elevation view of a seismic handling device of the present invention.

Securely positioned within the seismic handling device 14 is the delivery system 20. The delivery system 20 can include one or more overhead booms 30, a boom plate 32, a deployment mechanism 34, and a drive mechanism 36. The boom plate 32 is attached to the overhead boom 30. When attaching the overhead boom 30 to the boom plate 32 any conventional manner of assembly can be used such as welding or riveting, but the method chosen should not impede the operation of the deployment mechanism 34. Both the overhead boom 30 and the boom plate 32 should be of sufficient length to allow the overhead boom 30 and the boom plate 32 to substantially extend beyond the stern of the vessel. As best shown in FIGS. 5 and 6, however, the boom plate 32 should be substantially wider than the overhead boom 30 creating a guide upon which the deployment mechanism 34 travels. The overhead boom 30 having a bow end 38 and a stern end 40 is generally connected to the cross structural members 26 as illustrated in FIG. 5. Any desired manner of construction may be employed for joining the overhead boom 30 and the cross structural members 26 such as welding, riveting, etc. A structural steel member may be used as the overhead boom 30. The boom plate 32 may be any durable structural material such as steel.

The deployment mechanism 34 is mounted on the boom plate 32 as shown in FIG. 7. The deployment mechanism 34 may include a plurality of guide plates 42, a plurality of connector beams 44, and a winch mount plate 46. The guide plates 42, the connector beams 44, and the winch mount plate 46 are fastened together as illustrated in FIG. 7. While FIG. 7 shows the guide plates 42, the connector beams 44, and the winch mount plate 46 fastened by conventional bolts 47, it is contemplated that the guide plates 42, the connector beams 44, and the winch mount plate 46 may be fastened to one another using any conventional means, such as welding, riveting, bolting, etc. Once assembled, the guide plates 42, the connectors beams 44, and the winch mount plate 46 form a slot 48 which accepts the boom plate 32. A plurality of friction reducing liners 50, 51, and 52 are disposed with the slot 48. The liners 50, 51, and 52 should be made of a material, such as teflon, which allow the deployment mechanism 34 to remain a fixed distance from the overhead boom 30 and the boom plate 32 while still maintaining the ability to fluidly move along the overhead boom 30 and the boom plate 32. The guide plates 42, the connector beams 44, and the winch mount plate 46 may be fabricated from any material suitable to withstand high stress loads, such as steel.

The positioning of the deployment mechanism 34 upon the boom plate 32 allows the deployment mechanism 34 to freely slide along the boom plate 32 as best depicted in FIGS. 7 and 8. Extending from the stern side of the deployment mechanism is an arm 53 as best shown in FIG. 8. The arm may include a plurality of beams 54. As shown in FIG. 9, the beams 54 are interconnected to an eye hook plate 55. An eye hook 56 may be attached to the eye hook plate 55 as illustrated in FIGS. 8 and 9. The deployment mechanism 34 is assembled in such a manner as to allow the arm 53 to extend beyond the second end of the overhead boom 40 during deployment and retrieval of seismic exploration device 16. During operation of the seismic handling device 16, a pulley may be attached to the eye hook 56. The pulley enables the seismic exploration device 16 to be properly positioned beneath the deployment mechanism 34 as best illustrated in FIG. 2. A winch 57 is attached to the winch mount plate 46 such that the operational components of the winch 57 face the vessel 10 and the sea 12 as best shown in FIG. 8 and 9.

Connected to the overhead boom 30 and the deployment mechanism 34 is a drive mechanism 36 as depicted in FIG. 8. The drive mechanism 36 generally propels the deployment mechanism 34 along the overhead boom 30 and boom plate 32. The drive mechanism 36 can include a first sprocket 58, a second sprocket 60, and a drive chain 62. The first sprocket 58 may be connected using conventional means, such as riveting, bolting, etc. to a first sprocket mount plate 64 which is typically fastened to the first end 38 of the overhead boom 30. Similarly, the second sprocket 60 may be connected using conventional means such as riveting, bolting, etc. to a second end sprocket mount plate 66 which is typically fastened to the second end 40 of the overhead boom 30. The drive chain 62 is connected to a first end 68 and a second end 70 of the deployment mechanism 34. Tension adjusters may be used when connecting the drive chain 62 to the deployment mechanism 54. Once connected to the deployment mechanism 34, the drive chain 62 is positioned upon the first sprocket 58 and the second sprocket 60 forming a continuous drive loop.

While a sprocket and drive chain configuration has been described for the drive mechanism 36, other conventional systems for propelling objects in a similar manner may be used. The first sprocket 58 may be an idler sprocket. The second sprocket 60 may be hydraulically driven motor sprocket.

When utilizing the seismic exploration device 16 with the seismic handling device 14, certain steps should be taken. First, the seismic handling device 14 with seismic exploration device 16 attached thereto should be transported by a suitable vessel 10 to a predetermined location in the sea 12, or other body of water suitable for seismic exploration. Once at the location, the seismic exploration device 16 can be lifted vertically above the vessel 10 using the seismic handling device 14. The seismic exploration device 16 may then be propelled horizontally toward the stern of the vessel 10 by the seismic handling device 14 until the entire seismic exploration device 16 is above the sea 12 and clear of the vessel 10. The seismic handling device 16 can then be lowered vertically into the sea 12. Once in the sea 12, the seismic exploration device 14 may be towed at a predetermined distance behind the vessel 10. After the seismic exploration device 14 completes its survey, the seismic exploration device 14 may be retrieved from the sea 12 using the seismic handling device 16. When the above mentioned steps are taken, the seismic exploration device 16 can be deployed and retrieved safely and without damage.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A seismic handling device for transporting, deploying and retrieving a seismic unit on a sea vessel comprising:
   a plurality of substantially vertical structural members extending from the vessel;
   a plurality of horizontal structural members fixedly connected to said vertical structural members; and
   a delivery system securely connected to said horizontal structural members, said delivery system selectively positions the seismic unit into the sea and selectively retrieves the seismic unit from the sea.

2. The device as recited in claim 1 wherein said delivery system comprises:
   an overhead boom;
   a boom plate attached to said overhead boom;
   a deployment mechanism slidably mounted to said boom plate, said deployment mechanism selectively attachable to the seismic unit; and
   a drive mechanism connected to said overhead boom and said deployment mechanism such that said drive mechanism propels said deployment mechanism generally horizontally along said overhead boom.

3. The device as recited in claim 2 wherein said overhead boom has first and second ends and first and second sprocket mount plates respectively disposed at said first and second ends.

4. The device as recited in claim 3 wherein said drive mechanism comprises:
   first and second sprockets rotatably mounted to said first and second sprocket mount plates; and a drive chain securely connected to said deployment mechanism and selectively positioned upon said first and second sprockets enabling said drive mechanism to propel said deployment mechanism along said overhead boom.

5. The device as recited in claim 2 wherein said deployment mechanism comprises:
   a plurality of guide plates;
   a plurality of connector beams connected to said guide plates;
   a winch mount plate connected to said connector beams such that said guide plates, said connector beams and said winch mount plate form a slot to accept said boom plate;
   a plurality of friction reducing liners disposed within said slot;
   an arm extending from said winch mount plate, said arm having a plurality of beams, an eye hook plate interconnected to said beams and an eye hook attached to said eye hook mount plate; and
   a winch fixedly mounted to said winch mount plate such that said winch is suspended beneath said winch mount plate.

6. A delivery system for deploying and retrieving a seismic unit from a sea vessel comprising:
   an overhead boom having a first end and a second end, said overhead boom securely attached within a seismic handling device, said overhead boom includes a first sprocket mount plate fastened to said first end and a second sprocket mount plate fastened to second end;
   a boom plate attached to said overhead boom;
   a deployment mechanism slidably mounted to said boom plate; and
   a drive mechanism securely connected to said overhead boom and said deployment mechanism such that said drive mechanism propels said deployment mechanism along said overhead boom.

7. The delivery system as recited in claim 6 wherein said deployment mechanism comprises:
   a plurality of guide plates;
   a plurality of connector beams connected to said guide plates;
   a winch mount plate connected to said connector beams such that said guide plates, said connector beams and said winch mount plate form a slot to accept said boom plate;
   a plurality of friction reducing liners disposed within said slot;
   an arm extending from said winch mount plate, said arm having a plurality of beams, an eye hook plate interconnected to said beams and an eye hook attached to said eye hook mount plate; and
   a winch fixedly mounted to said winch mount plate such that said winch is suspended beneath said winch mount plate.

8. The delivery system as recited in claim 6 wherein said drive mechanism comprises:

a first sprocket fastened to said first sprocket mount plate;

a second sprocket fastened to said second sprocket mount plate; and a drive chain securely connected to said deployment mechanism and selectively positioned upon said first sprocket and said second sprocket enabling said drive mechanism to propel said deployment mechanism along said overhead boom.

9. The delivery system as recited in claim 8 wherein said first sprocket is an idler sprocket.

10. The delivery system as recited in claim 8 wherein said second sprocket is a hydraulically driven sprocket.

11. A seismic handling device for transporting, deploying, and retrieving a seismic unit from a sea vessel comprising:

a plurality of substantially vertical structural members extending from the vessel;

a plurality of horizontal structural members fixedly connected to said vertical structural members;

an overhead boom having a first end and a second end, said overhead boom securely attached to said horizontal structural members, said overhead boom includes a first sprocket mount plate fastened to said first end and a second sprocket mount plate fastened to said second end;

a boom plate attached to said to overhead boom;

a deployment mechanism slidably mounted to said boom plate; and a drive mechanism connected to said overhead boom and said deployment mechanism such that said drive mechanism propels said deployment mechanism generally horizontally along said overhead boom.

12. The device as recited in claim 11 wherein said overhead boom is substantially positioned within the seismic handling device such that said second end of said overhead boom substantially extends over the sea.

13. The device as recited in claim 11 wherein said deployment mechanism comprises:

a plurality of guide plates;

a plurality of connector beams connected to said guide plates;

a winch mount plate connected to said connector beams such that said guide plates, said connector beams and said winch mount plate form a slot to accept said boom plate;

a plurality of friction reducing liners disposed within said slot;

an arm extending from said winch mount plate, said arm having a plurality of beams, an eye hook plate interconnected to said beams and an eye hook attached to said eye hook mount plate; and a winch fixedly mounted to said winch mount plate such that said winch is suspended beneath said winch mount plate.

14. The device as recited in claim 11 wherein said drive mechanism comprises:

a first sprocket fastened to said first sprocket mount plate;

a second sprocket fastened to said second sprocket mount plate; and a drive chain securely connected to said deployment mechanism and selectively positioned upon said first sprocket and said second sprocket enabling said drive mechanism to propel said deployment mechanism along said overhead boom.

15. The device as recited in claim 14 wherein said first sprocket is an idler sprocket.

16. The device as recited in claim 14 wherein said second sprocket is a hydraulically driven sprocket.

17. A method for deploying and retrieving a seismic unit from a sea vessel comprising the steps of:

transporting the seismic unit on the vessel to a predetermined location;

selectively deploying the seismic unit into the sea using a seismic handling device mounted on the vessel, said seismic handling device includes a plurality of substantially vertical structural members extending from the vessels, a plurality of horizontal structural members fixedly connected to said vertical structural members and a delivery system securely connected to said horizontal structural members;

towing the seismic unit behind the vessel at a predetermined distance; and selectively retrieving the seismic unit from the sea.

18. The method as recited in claim 17 further comprising the step of coupling the seismic unit to the seismic handling device.

19. The method as recited in claim 17 wherein the step of deploying further comprises:

moving the seismic unit to a position above the sea;

lowering the seismic unit into the sea such that floatation devices on the seismic unit are properly engaged; and fully submerging the seismic unit to a desired tow depth.

20. The method as recited in claim 17 wherein the step of towing further comprises paying out a tow line from said seismic handling device until a primary safety tow line engages at a desired tow distance.

* * * * *